(12) United States Patent
Hummel (10) Patent No.: US 10,746,292 B2
(45) Date of Patent: Aug. 18, 2020

(54) ACTUATOR DEVICE FOR A GEARBOX OF A MOTOR VEHICLE AND CORRESPONDING GEARBOX FOR A MOTOR VEHICLE

(71) Applicant: AUDI AG, Ingolstadt (DE)

(72) Inventor: Steffen Hummel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/778,853

(22) PCT Filed: Mar. 14, 2014

(86) PCT No.: PCT/EP2014/000700
§ 371 (c)(1),
(2) Date: Sep. 21, 2015

(87) PCT Pub. No.: WO2014/146771
PCT Pub. Date: Sep. 25, 2014

(65) Prior Publication Data
US 2016/0047468 A1 Feb. 18, 2016

(30) Foreign Application Priority Data
Mar. 22, 2013 (DE) .......................... 10 2013 004 953

(51) Int. Cl.
*F16H 61/28* (2006.01)
*F16H 61/32* (2006.01)
(Continued)

(52) U.S. Cl.
CPC ............. *F16H 61/28* (2013.01); *F16H 61/32* (2013.01); *F16H 63/20* (2013.01); *F16H 63/206* (2013.01);
(Continued)

(58) Field of Classification Search
CPC .. F16H 61/28; F16H 61/32; F16H 2061/2853; F16H 63/20; F16H 63/28;
(Continued)

(56) References Cited

U.S. PATENT DOCUMENTS 7,240,578 B2 * 7/2007 Ogami .................... F16H 63/20
74/340
7,467,564 B2 12/2008 Baldwin
(Continued)

FOREIGN PATENT DOCUMENTS

| CN | 102537324 A | 7/2012 |
| DE | 4007120 | 9/1990 |

(Continued)

OTHER PUBLICATIONS

Chinese Search Report dated Jan. 11, 2017 with respect to Chinese counterpart Chinese patent application 201480017072.5.
(Continued)

*Primary Examiner* — Joseph Brown
(74) *Attorney, Agent, or Firm* — Henry M. Feiereisen LLC (57) ABSTRACT

An actuator device for a gearbox of a motor vehicle includes a plurality of selector shafts displaceable in a first direction between a plurality of selection positions and in a second direction between a plurality of shifting positions and which each have a connecting element that is operatively-connected in at least one of the selection positions with at least one selector rail of the gearbox for transferring a movement of the selector shaft in the second direction onto the selector rail. The selector shafts are mounted relative to each other to be movable relative to one another in the first direction and are fixed to relative to each other in the section direction The selection positions of the selector shafts are independently adjustable by of a plurality of first adjusting elements and
(Continued)

wherein the selector shafts can be displaced together between the shifting positions by means of a second adjusting element.

10 Claims, 9 Drawing Sheets

(51) Int. Cl.
    *F16H 63/30*    (2006.01)
    *F16H 63/28*    (2006.01)
    *F16H 63/22*    (2006.01)
    *F16H 63/20*    (2006.01)
    *F16H 63/02*    (2006.01)

(52) U.S. Cl.
    CPC ............. *F16H 63/22* (2013.01); *F16H 63/28* (2013.01); *F16H 63/3069* (2013.01); *F16H 2061/2853* (2013.01); *F16H 2063/025* (2013.01); *F16H 2063/208* (2013.01); *F16H 2063/305* (2013.01); *F16H 2063/3073* (2013.01)

(58) Field of Classification Search
    CPC .. F16H 63/206; F16H 63/285; F16H 63/2069; F16H 2063/208; F16H 2063/305; F16H 2063/2073; F16H 63/22; F16H 63/30
    See application file for complete search history.

(56) References Cited

U.S. PATENT DOCUMENTS

| | | | |
|---|---|---|---|
| 7,691,029 B2 | 4/2010 | Guggolz | |
| 8,069,743 B2 | 12/2011 | Shintani | |
| 9,127,767 B2 * | 9/2015 | Hagberg | ................ F16H 61/32 |
| 2006/0201269 A1 | 9/2006 | Maillard et al. | |
| 2015/0075308 A1 * | 3/2015 | Enami | ................... F16H 59/041 |
| | | | 74/335 |
| 2015/0323068 A1 * | 11/2015 | Han | ....................... F16H 3/083 |
| | | | 74/374 |

FOREIGN PATENT DOCUMENTS

| | | | | |
|---|---|---|---|---|
| DE | 10205689 | | 7/2003 | |
| DE | 10205689 C1 * | | 7/2003 | ............. F16H 61/32 |
| DE | 10249951 | | 5/2004 | |
| DE | 102005058406 | | 6/2004 | |
| DE | 102004052804 | | 1/2006 | |
| DE | 102007010871 | | 10/2007 | |
| DE | 602004006681 | | 1/2008 | |
| DE | 102009056147 | | 6/2010 | |
| DE | 102010050382 | | 6/2011 | |
| DE | 102010050382 A1 * | | 6/2011 | ............. F16H 61/28 |
| DE | 102010043685 | | 5/2012 | |
| EP | 2143979 | | 1/2010 | |
| WO | WO 2004/081418 | | 9/2004 | |
| WO | WO2009/065571 | | 5/2009 | |

OTHER PUBLICATIONS

English translation of Chinese Search Report dated Jan. 11, 2017 with respect to Chinese counterpart Chinese patent application 201480017072.5.

* cited by examiner

ACTUATOR DEVICE FOR A GEARBOX OF A MOTOR VEHICLE AND CORRESPONDING GEARBOX FOR A MOTOR VEHICLE

CROSS-REFERENCES TO RELATED APPLICATIONS

This application is the U.S. National Stage of International Application. No. PCT/EP2014/000700, filed Mar. 14, 2014, which designated the United States and has been published as international Publication No. WO 2014/146771 and which claims the priority of German Patent Application, Serial No. 10 2013 004 953.9, filed Mar. 22, 2013, pursuant to 35 U.S.C. 119(a)-(d).

BACKGROUND OF THE INVENTION

The invention relates to an actuator device for a transmission of a motor vehicle with multiple selector shafts which are each displaceable in a first direction between multiple selection positions and in a second direction between multiple shifting positions, and which each have a connecting element which in at least one of the selection positions is operatively connected with at least one selector rail of the transmission for transmitting a movement of the selector shaft in the second direction to the selector rail. The invention also relates to a corresponding transmission of a motor vehicle.

The transmission includes the at least one selector rail, however, preferably multiple selector rails. Each selector rail is for example operatively connected with a selector sleeve and/or a synchronizer ring of the transmission. This arrangement is configured so that by the displacement of the selector rail into a defined position a defined gear of the transmission is selected and set or engaged. In particular each selector rail can be brought into multiple positions, wherein a first one of the positions is a free wheeling position, in which by means of this selector rail no gear but rater a neutral position is set in the transmission. In the second of the positions of the selector rail, a defined gear is correspondingly selected and engaged in the transmission. Optionally the positions can include a third position in which another gear is selected and engaged in the transmission. Thus, for example each selector rail can be brought into three positions, wherein these positions correspond to a neutral position, a first one of multiple gears of the transmission or a second one of the gears.

Of course any desired number of such selector rails can be provided so that by corresponding arrangement of the selector rails a defined gear can be selected from a plurality of different gears and engaged in the transmission. For the displacement of the selector rails that is required for this purpose, the actuator device is provided, which is assigned to the transmission of the motor vehicle. The actuator device includes the multiple selector shafts. Each of the selector shafts can be operatively connected with at least one of the selector rails of the transmission via the respective connecting element. Each selector shaft is hereby assigned at least one of the selector rails. As an alternative, an assignment of multiple different selector rails to at least one of the selector shafts, in particular to each selector shaft, can be provided.

The selector shafts can each be displaced in a first direction between multiple selection positions and in a second direction between multiple shifting positions. As a result of the displacement of the respective selector shaft into a defined one of the selection positions it is determined whether and with what selector rail this selector shaft becomes operatively connected. By a displacement between multiple shifting positions on the other hand, the selector rail selected by the selection position is displaced so that according to the explanations above a defined gear is selected and engaged in the transmission. From the state of the art for example the published patent application DE 10 2010 050 382 A1 is known, which describes an actuation system for an electromagnetic synchronizing device. Hereby a selector rail and with this a shift fork can be brought into three different position by means of control coils.

SUMMARY OF THE INVENTION

It is an object of the invention to propose an actuation device for a transmission of a motor vehicle, which compared to the state of the art is constructed simpler and more cost-effective while still enabling a fast selection and setting of the desired gear.

According to the invention this is achieved with an actuator device for a transmission of a motor vehicle, including a plurality of selector shafts displaceable into a first direction between multiple selection positions and in a second direction between multiple shifting positions, each said selector shafts having a connecting element, which in at least one of the selection positions is operatively connected with at least one selector rail of the transmission for transmitting a movement of the selector shaft in the second direction to the selector rail, wherein the selector shafts are mounted relative to each other so as to be movable relative to each other in the first direction and to be fixed relative to each other in the second direction; a plurality of first setting devices, wherein the selection positions of the selector shafts are settable independent of each other by the first setting devices, and a second setting device, wherein the selector shafts are displaceable together between the shifting positions by the second setting device. Hereby it is provided that the selector shafts are mounted relative to each other so as to be movable relative to each other in the first direction and so as to be fixed relative to each other in the second direction, wherein the selection positions of the selector shafts can be adjusted independent of each other with multiple first setting devices, and wherein the selector shafts can be displaced together between the shifting positions by means of a second setting device. It is thus provided that each selector shaft is assigned an own first setting device. In this way each selector shaft can be displaced into the desired selection position independent of the other selector shafts. The selection position of each selector shaft can thus be selected and set entirely independent of the selection positions of the other selector shaft.

On the other hand, it is provided that all selector shafts are assigned a common second setting device. The actuator device thus has multiple first setting devices but only one single second setting device. The single setting device serves for displacing all selector shafts together between the shifting positions, so that all selector shafts are always present in the same shifting position that is selected from the available shifting positions. Compared to the actuator device devices in which each selector shaft is assigned a first setting device and a second setting device, the actuator device according to the invention does not require a plurality of second setting devices.

At the same time the advantages of the actuator device devices known from the state of the art are retained to the most degree. In particular, with the actuator device according to the invention it is possible to select and set multiple gears simultaneously, which is in particular very important with regard to designing the transmission as dual clutch transmission. In such a construction as a dual clutch transmission, multiple sub-transmissions, in particular two sub-transmissions, are provided. Each of these sub-transmissions are assigned at least one selector shaft of the actuator device and with this an own first setting device. However, only one single second setting device is available to the dual clutch transmission so that all selector shafts of the dual clutch transmission can be or are displaced together between the multiple shifting positions.

Generally any number of selector shafts can be provided, wherein preferably at least two, at least three or at least four selector shafts are present. The selector shafts are arranged relative to each other so that they can be freely moved relative to each other in a first direction at least within defined limits. In the second direction on the other hand they are fixed relative to each other so that in the case of a displacement of one of the selector shafts between different shifting positions always all of the selector shafts are displaced in the selected shifting position.

In a further embodiment of the invention it is provided that each selector shaft is only assigned one or at least two selector rails. The number of the selector rails that are assigned to each selector shaft is in particular determined by way of the total number of the gears of the transmission and the number of the selector shafts. For example when four selector rails and two selector shafts are present, each of the selector shafts have to be assigned at least two of the selector rails. On the other hand, when more selector shafts, for example four selector shafts, are provided each of the selector shaft can only be assigned one single selector rail. Nevertheless all gears of the transmission can be controlled by means of the actuator device device.

A refinement of the invention provides that the selector shafts are supported for rotation about a common rotation axis. The selector shafts are thus arranged coaxial to each other. For example a shaft-hub-connection is provided between the selector shafts or between an intermediate shaft and at least one of the selector shafts, in particular thus a formfitting connection, which permits a displacement of the selector shafts in the direction of the common rotation axis, but on the other hand transmits a rotation movement about the rotation axis between all selector shafts. For example the shaft-hub-connection is configured as gear coupling.

In an advantageous embodiment of the invention, each selector shaft has a restoring device, which urges the selector shaft in the direct of a selection position which represents a neutral position. The neutral position is that one of the multiple selection positions in which the selector shaft is not operatively connected to the selector shaft or selector shafts assigned to it. When thus the shifting position of the selector shafts is changed, no actuation of those selector rails occurs that are assigned to a selector shaft, which is currently in the neutral position. By means of the restoring device it is achieved that the selector shaft does not explicitly have to be displaced by means of the first setting device to assume the neutral position.

A particularly advantageous embodiment of the invention provides that the first direction is the axial direction relative to the rotation axis and/or the second direction is the circumferential direction relative to the rotation axis. In case of a displacement of the selector shaft in the first direction thus a transverse movement occurs or in case of a displacement in the second direct a rotational movement occurs. In such a configuration an operative connection between the selector shafts by means of the above-described shaft-hub-connection is realized. As an alternative an inverse configuration can be realized in which the first direction is the circumferential direction relative to the rotation axis and the second direction is the axial direction relative to the rotation axis.

In a refinement of the invention, the first setting devices are configured as magnetic setting devices. The displacement of the selector shafts into the respectively desired selection position thus occurs by means of the magnetic setting devices which for this purpose have at least one magnetic coil which is configured to cause a displacement of the respective selector shaft in the first direction when supplied with current. The use of such magnetic setting devices has the advantage that extremely short setting times can be achieved.

In a further advantageous embodiment of the invention the second setting device is configured as electric motor, which is operatively connected to the selector shafts. The electric motor is provided for generating a rotational movement and to transmit this rotational movement to the selector shafts. For example the electric motor is directly, or via a transmission, operatively connected with one of the selector shafts or an intermediate shaft.

In a preferred embodiment of the invention the selector shafts are operatively connected with the second setting device via an intermediate shaft. According to the above description no direct operative connection between the electric motor and the selector shafts is present. Rather the electric motor is for example directly connected to the intermediate shaft, or via the transmission. Connected to the intermediate shaft is at least one of the selector shafts so that the torque of the electric motor can be transmitted between the intermediate shaft and the at least one selector shaft.

Finally, it can be provided that the selector shafts are supported on the intermediate shaft in rotative fixed relationship with the intermediate shaft and so as to be axially displaceable. This is in particular the case when exactly two selector shafts are provided, which are for example connected to the intermediate shaft at opposing sides of the intermediate shaft. In this case for example one of the shaft-hub-connections as described above is realized between each of the selector shafts and the intermediate shaft. In case of a rotational movement of the intermediate shaft, the rotational movement is thus transmitted to the selector shafts that are connected to the intermediate shaft so that by means of the second setting device these selector shafts can be displaced together between the multiple shifting positions.

The invention also relates to a transmission of a motor vehicle with an actuator device device, in particular according to the description above, wherein the actuator device has multiple selector shafts, which can be displaced in a first direction between multiple selection positions and in a second direction between multiple shifting positions, and which each have a connecting element which in at least one of the selection positions is operatively connected with at least one selector rail of the transmission for transmitting a movement of the selector shaft in the second direction to the selector rail. Hereby it is provided that the selector shafts are mounted relative to each other so that they are movable relative to each other in the first direction and are fixed relative to each other in the second direction, wherein the selection positions of the selector shafts can be set independent of each other by means of multiple first setting devices, and wherein the selector shafts can be displaced together between the shifting positions by means of a second setting device. The advantages of such a configuration of the actuator device and the transmission have already been mentioned above. The actuator device and also the transmission can be further refined according to the description above, so that reference is made to this description. The transmission is for example constructed as multiple clutch transmission, in particular as dual clutch transmission.

BRIEF DESCRIPTION OF THE DRAWING

In the following the invention is explained in more detail by way of the exemplary embodiments shown in the drawing without limiting the invention. It is shown in FIG. 1 a schematic representation of a first embodiment of an actuator device for a transmission of a motor vehicle, FIG. 2 a schematic representation of a second embodiment of the actuator device device, FIG. 3 a schematic representation of a first variant of the first embodiment, FIG. 4 a schematic representation of a second variant of the first embodiment, FIG. 5 a schematic representation of a third variant of the first embodiment, FIG. 6 a schematic representation of a fourth variant of the first embodiment, FIG. 7 A further schematic representation of the first variant of the first embodiment FIG. 8 a schematic representation of a third embodiment of the actuator device in a first view, and FIG. 9 a schematic representation of the third embodiment of the X-rated advice in its second view.

DETAILED DESCRIPTION OF PREFERRED EMBODIMENTS

Figure 1:
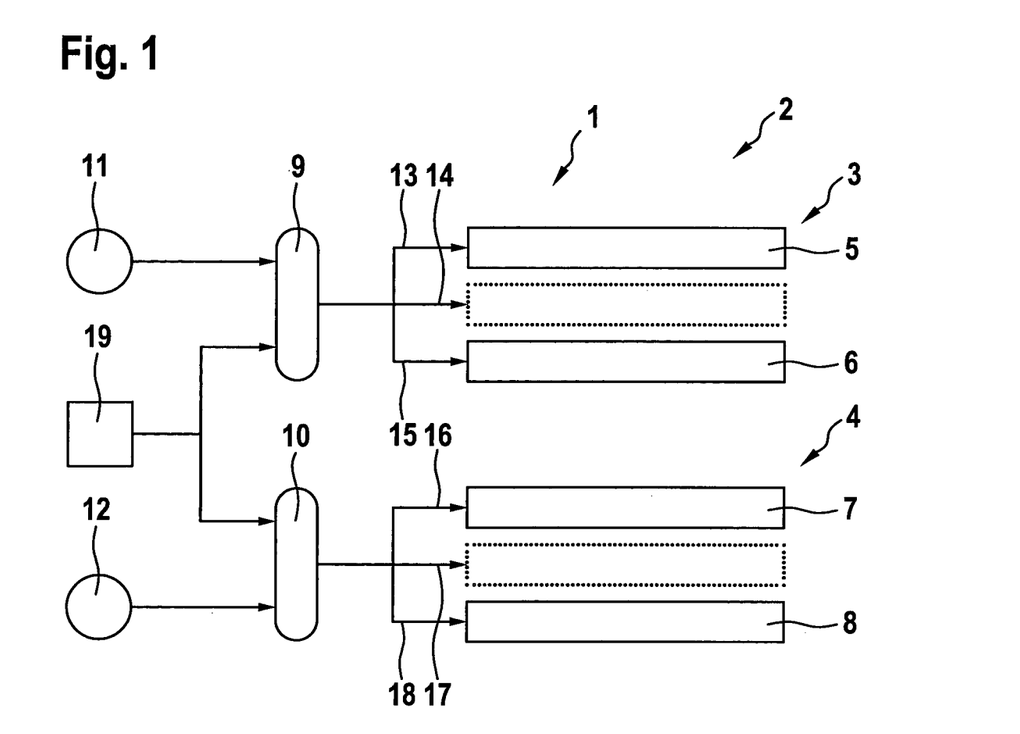

FIG. 1 shows a schematic representation of an actuator device 1 as part of a transmission 2 of a motor vehicle. The transmission is constructed in particular as dual clutch transmission with two sub-transmissions 3 and 4, wherein selector rails 5 and 6 are assigned to the first sub-transmission 3, and selector rails 7 and 8 are assigned to the second sub-transmission 4. Each of the selector rails 5 to 8 can be displaced into at least two positions, however in particular more than two positions. For example a of displacement each of the selector rails 5 to 8 in a first position situated behind the drawing plane, a second position situated in the Trenton plane, and a third position situated above the drawing plane is provided. Hereby he defined either of these sub transmission 3 or 4 is respectively selected and engaged in the first and the third position, while the second position represents a neutral position, in which no gear is engaged by means of the respective selector rail 5, 6, 7 or 8.

In the here shown first embodiment each sub-transmission 3 and 4 is assigned a selector shaft 9 or 10. Each of the selector shafts 9 and 10 can be displaced in a first direction between multiple selection positions, for which each selector shaft 9 and 10 is respectively assigned a first setting device 11 or 12. As indicated by the arrows 13, 14, 15, 16, 17 and 18, each of the selector shafts 9 and 10 can be displaced into three different selection positions. The selection positions of the selector shaft 9 are indicated by the arrows 13, 14 and 15, wherein the selection positions of the selector shaft 10 are indicated by the arrows 16, 17 and 18. In the selection position 13, the selector shaft 9 is operatively connected with the selector rail 5 via a here not shown connecting element, while the same is true in the selection position 15 with regard to the selector rail 6. In the case of the selector shaft 10 an operative connection with the selector rail 7 is present in the selection position 16, and an operative connection with the selector rail 8 is present in the selection position 18.

This means that in case of a displacement of the respective selector shaft 9 or 10 between multiple shifting positions, the selector rail 5, 6, 7 or 8 that has been selected by the respective selection position is displaced together with the respective selector shaft 9 or 10. In the selection position 14 on the other hand no connection of the selector shaft 9 with one of the selector rails 5 and 6 is present. The same is true for the selector shaft 9 in the selection position 17 in which no operative connection with the selector rails 7 and 8 is generated. While the selection positions of the selector shafts 9 and 10 can be selected and set independent of each other, this is not the case for the shifting positions. Although each of the selector shafts 9 and 10 can be displaced between multiple shifting positions, they are however always displaced together by means of a second setting device 19. For this purpose the selector shafts 9 and 10 are mounted relative to each other so that they are movable relative to each other in the first direction and are fixed relative to each other in the second direction.

Figure 2:
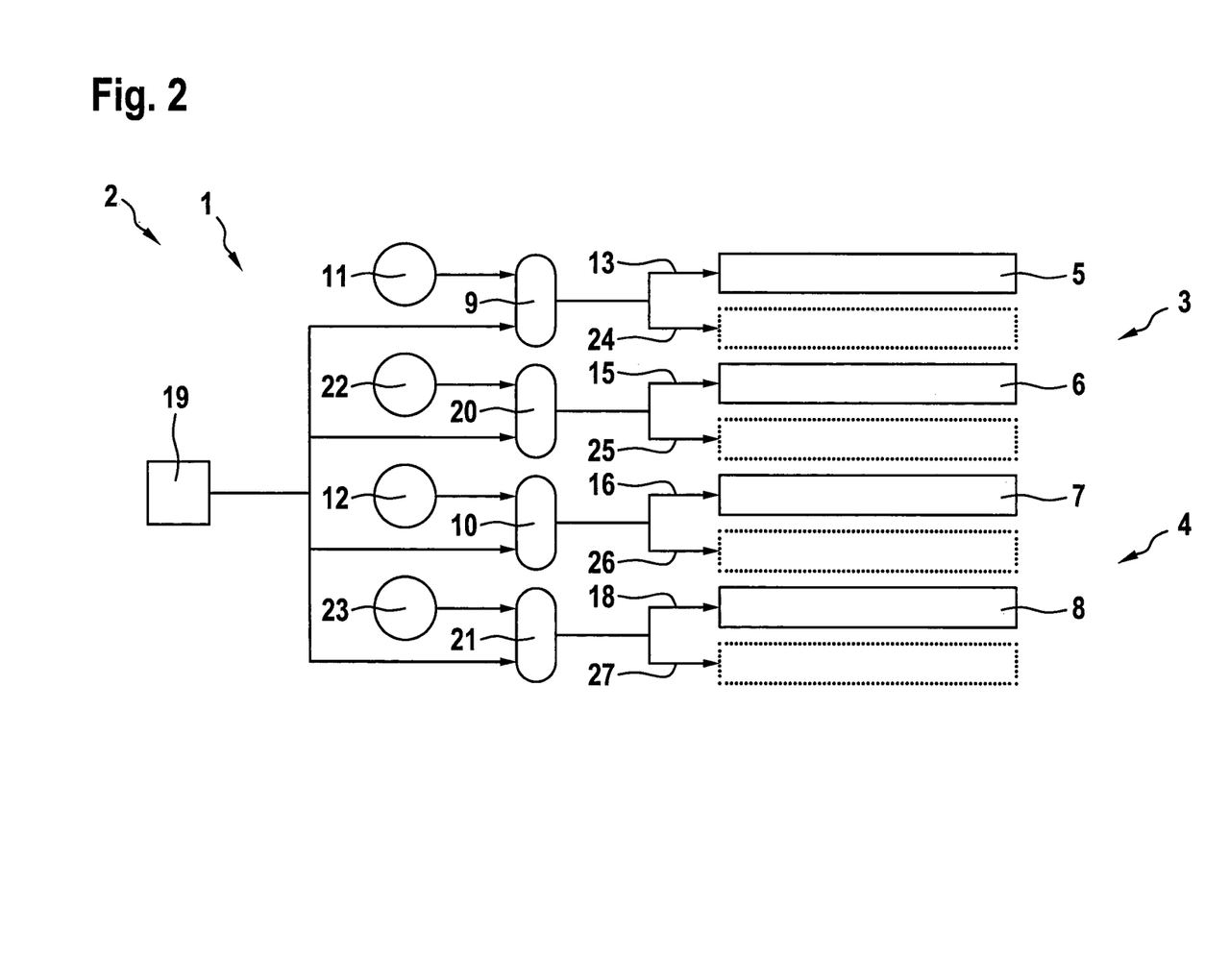

FIG. 2 shows a second embodiment of the actuator device 1. Generally reference is made to the description above and only the differences are described. It can be seen that each of the sub-transmission 3 and 4 are not only assigned a single selector shaft 9 or 10 but rather respectively two selector shafts 9 and 20 or 10 and 21. Also in this case each of the selector shafts 9, 10, 20 and 21 is assigned a respective setting device 11, 12, 22 or 23 so that each of the selector shafts 9, 10, 20 and 21 can be brought into the desired selection position independent of the respective other selector shafts.

It can also be seen that each of the selector shafts 9, 10, 20 and 21 is assigned only one of the selector rails 5, 6, 7 and 8. Correspondingly each of the selector shafts 10, 20 and 21 can be brought into a selection position 13, 15, 16 and 18 in which it is operatively connected with the respective selector rail 5, 6, 7 or 8. In a different selection position indicated by the arrows 24, 25, 26 and 27 on the other hand no operative connection is present.

Figure 3:
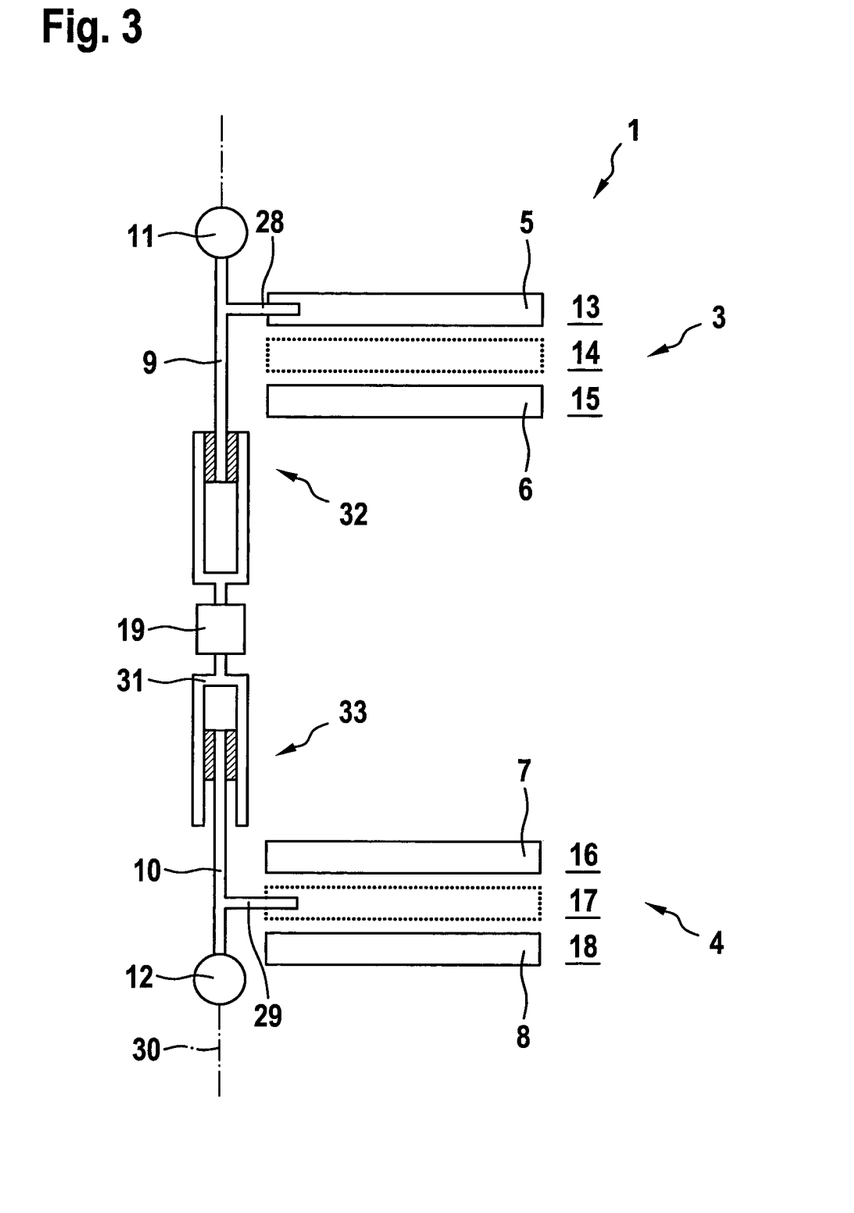

FIG. 3 shows a first variant of the first embodiment of the actuator device 1. Insofar references made to the description above. It can be seen that a connecting element 28 or 29 is provided on each of the selector shafts 9 and 10 for generating the respective operative connection with the selector rail 5 or 6 or the selector rail 7 or 8, The different selection positions are indicated by reference numerals 13 to 18. It can also be seen that the selector shafts 9 and 10 can be rotated about a common rotation axis. The first direction, which serves for setting the desired selection position, is thus the axial direction relative to the rotation axis 30, while the second direction, which serves for setting the shifting position, is the circumferential direction relative to the rotation axis 30.

The first setting devices 11 and 12 are constructed as magnetic setting devices, which enables an axial displacement of the respective selector shaft 9 or 10. The second setting device 19 on the other hand is constructed as an electric motor, which is operatively connected with the two selector shafts 9 and 10 via an intermediate shaft 31.

The intermediate shaft 31 is supported so as to be only rotatable about the rotation axis 30, i.e., it cannot be displaced in axial direction. In order to nevertheless permit displacement of the selector shaft 9 and 10 between the different selection positions, shaft-hub-connections 32 or 33 are provided between the intermediate shaft 31 and the selector shafts 9 and 10. Via these shaft-hub-connections 32 and 33 the selector shafts 9 to 10 are supported on the intermediate shaft 31 in rotative fixed relationship with the intermediate shat 31 and so as to be displaceable in axial direction.

Figure 4:
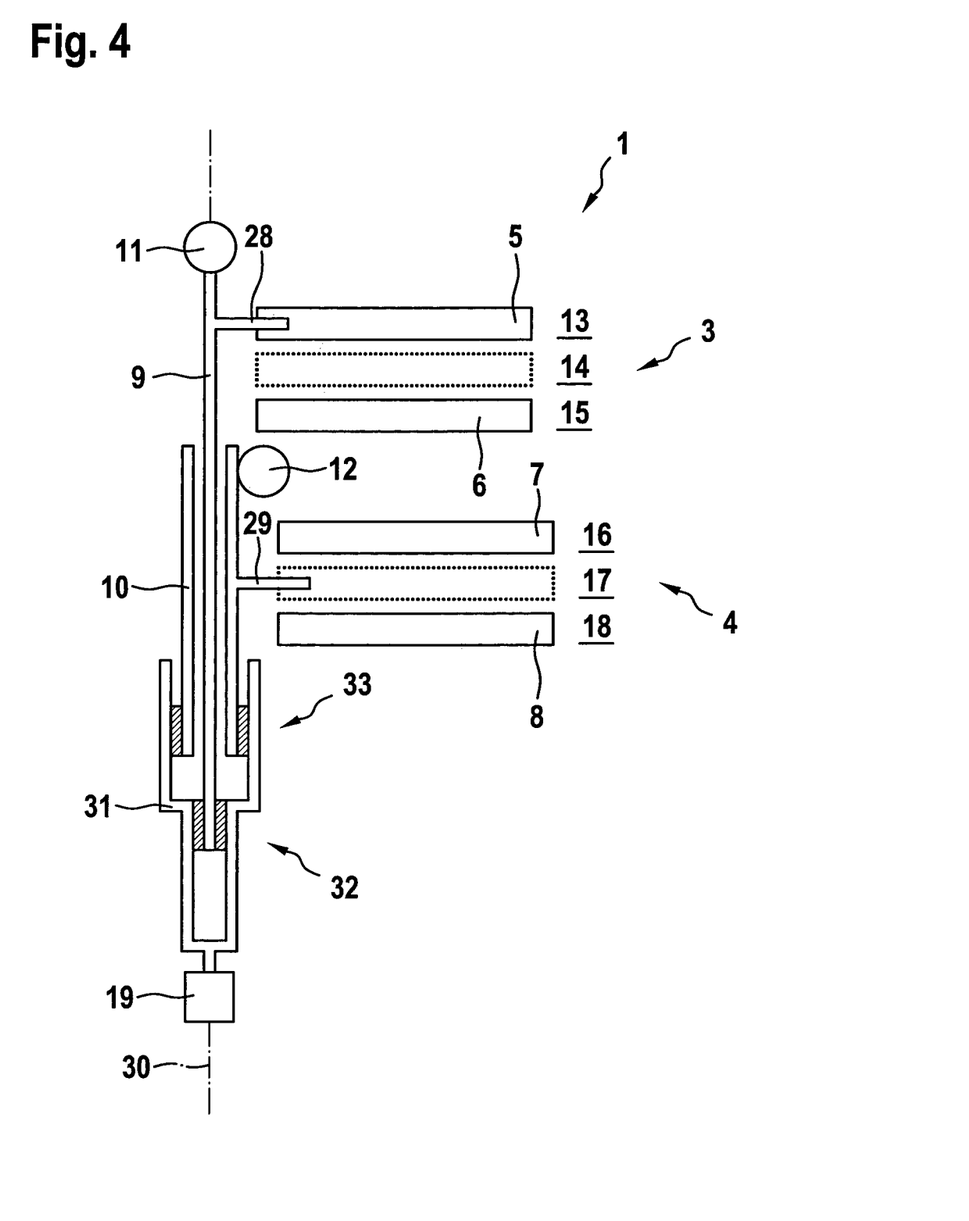

FIG. 4 shows a second variant of the first embodiment of the actuator device 1. While in the first variant the selector shafts 9 and 10 are arranged on opposite sides of the intermediate shaft 31, in this case they are arranged on the same side. Hereby the selector shafts 9 and 10 are arranged coaxial relative to each other, wherein however the selector shaft 9 traverses the selector shaft 10. The selector shaft 10 is insofar constructed as a hollow shaft.

Figure 5:
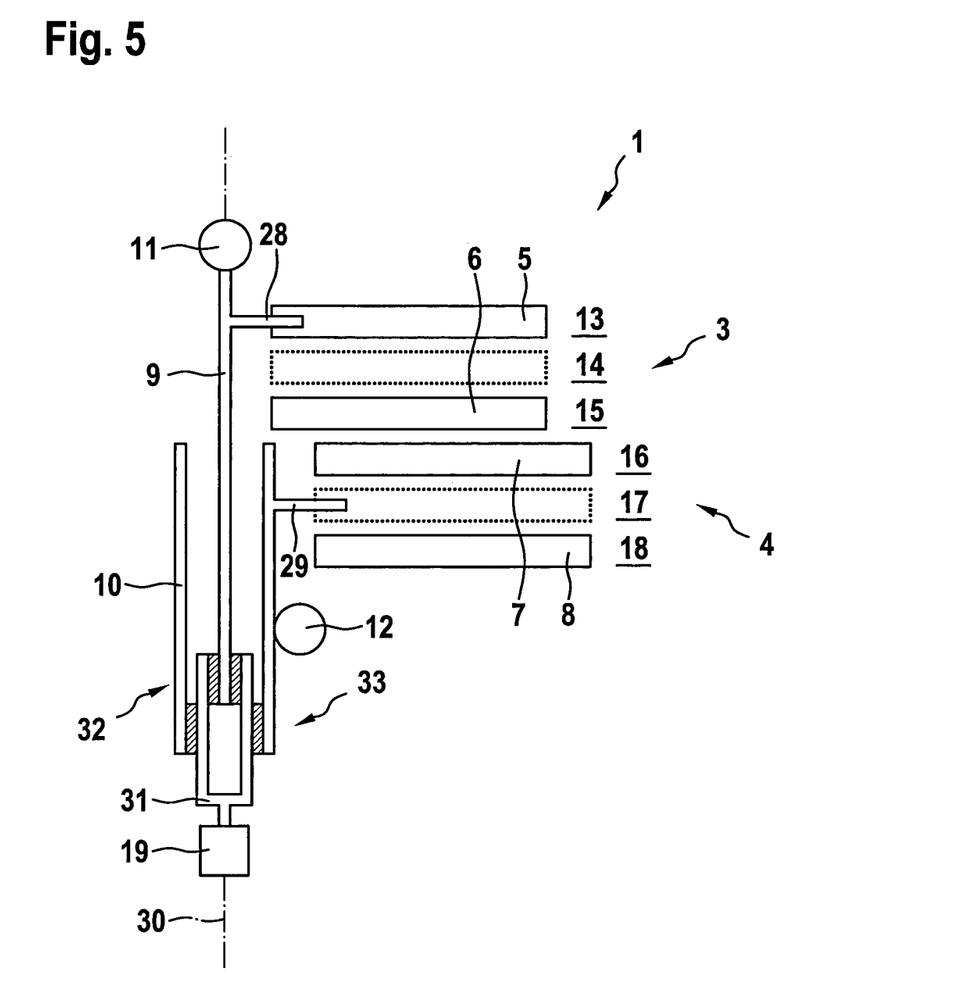

FIG. 5 shows a third variant of the first embodiment. Generally again references is made to the description above, in particular regarding the second variant of the first embodiment. The difference to the latter is essentially that the selector shaft 10 is constructed as a hollow shaft in such a manner that also the intermediate shaft 31 is partially received in the selector shaft 10. Correspondingly the shaft-hub-connection 33 between an outside of the intermediate shaft 31 and an inner wall of the selector shaft 10 is realized.

Figure 6:
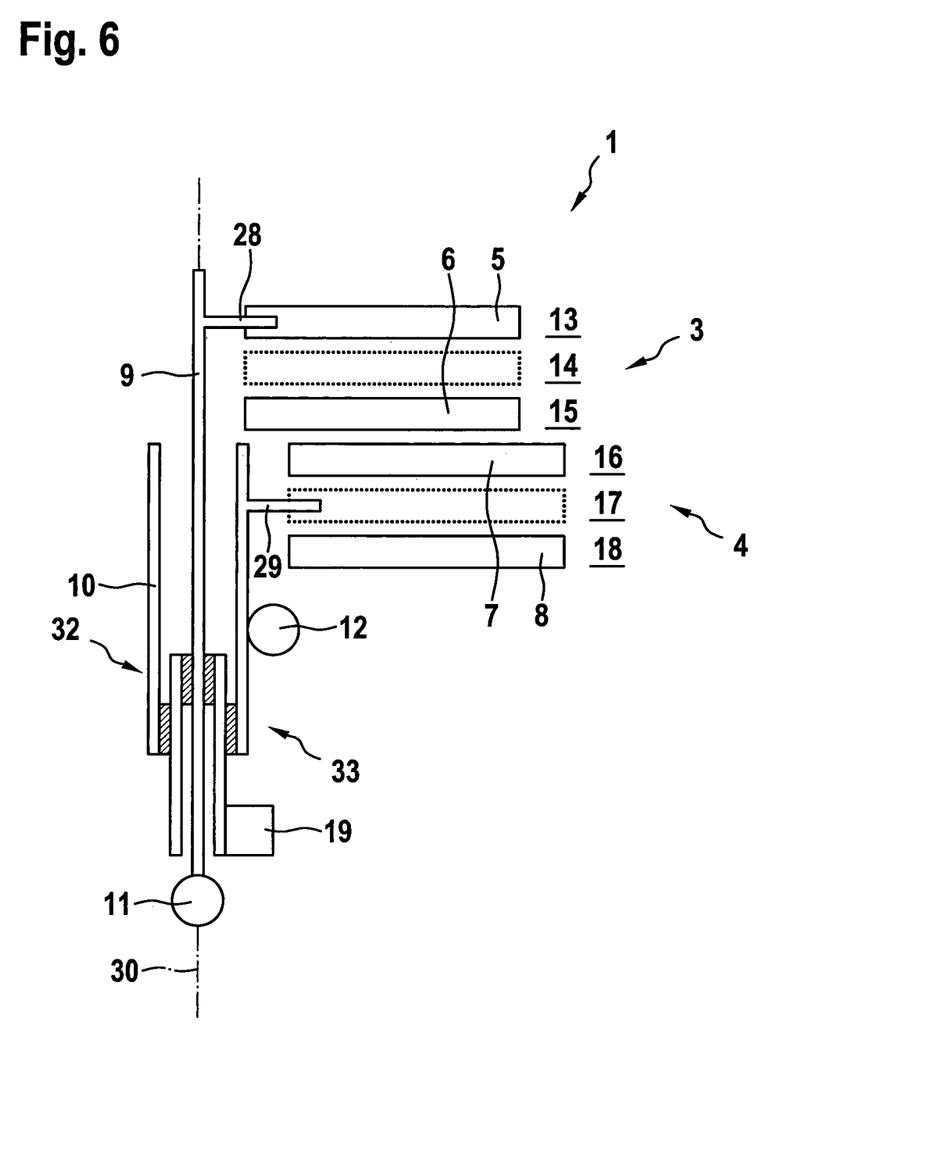

FIG. 6 shows a fourth variant the first embodiment of the actuator device 1. Also in this case reference is made to the description above. The difference to the third variant is essentially that the selector shaft 9 in this case fully traverses the intermediate shaft 31 in axial direction, so that correspondingly the second setting device 19 has to be arranged in an alternative position. This enables an arrangement, which is particularly space-saving in axial direction.

Figure 7:
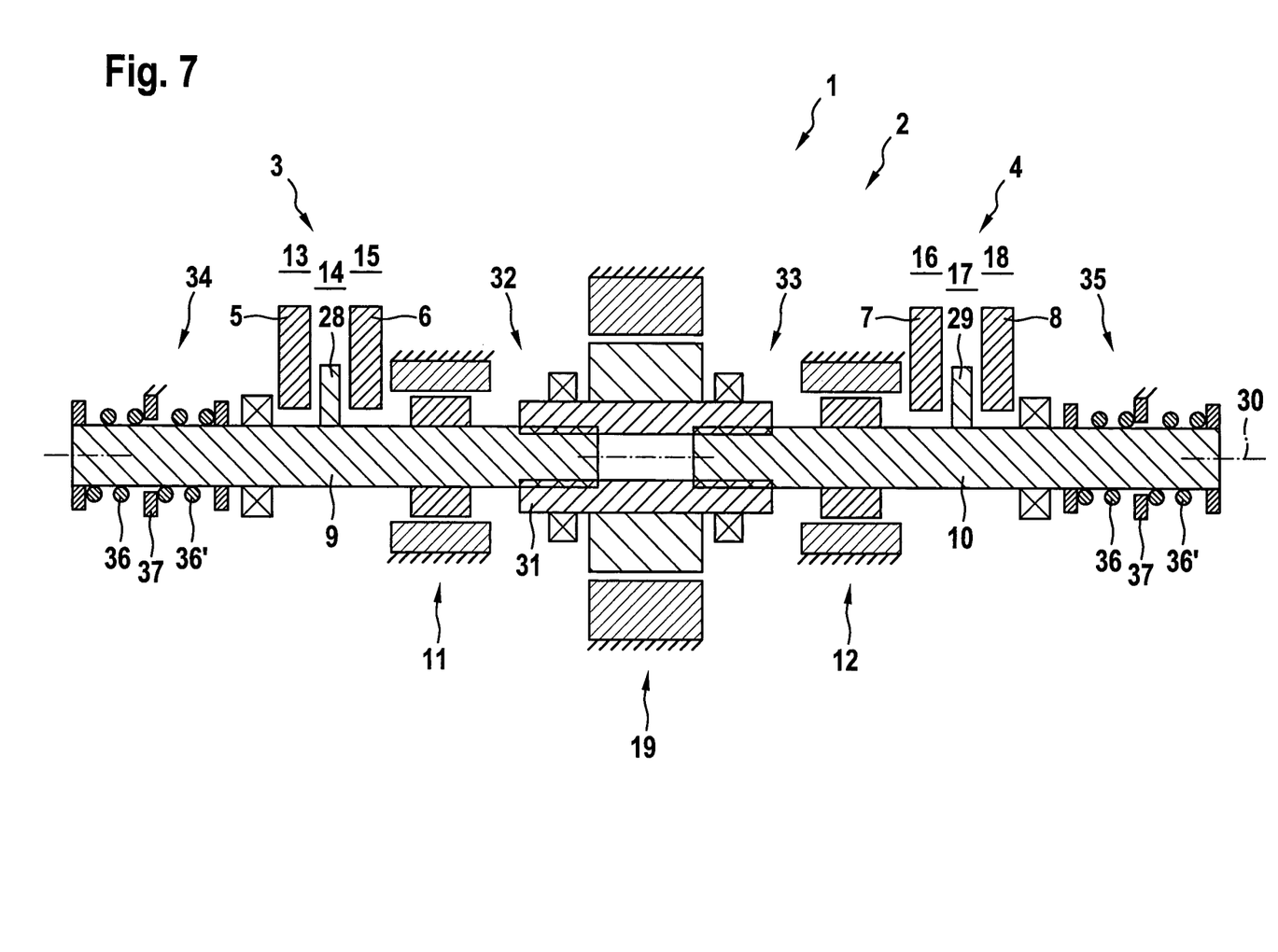

FIG. 7 shows a schematic representation of the first variant of the first embodiment, so that insofar references is made to the description above. It can be seen that each selector shaft 9 and 10 is assigned a respective restoring device 34 or 35. Each of the restoring devices 34 and 35 essentially consist of at least one spring element 36 and a positionally fixed reference element 37. For example two spring elements 36 and 36' are provided, which can exert opposing spring forces onto the respective selector shaft 9 or 10. The restoring devices 34 and 35 serve for urging the respective selector shaft 9 or 10 into the selection position, i.e., a neutral position, in which no operative connection to the selector rails 5 and 6 or 7 and 8 is generated via the connecting element 28 or 29.

Figure 8:
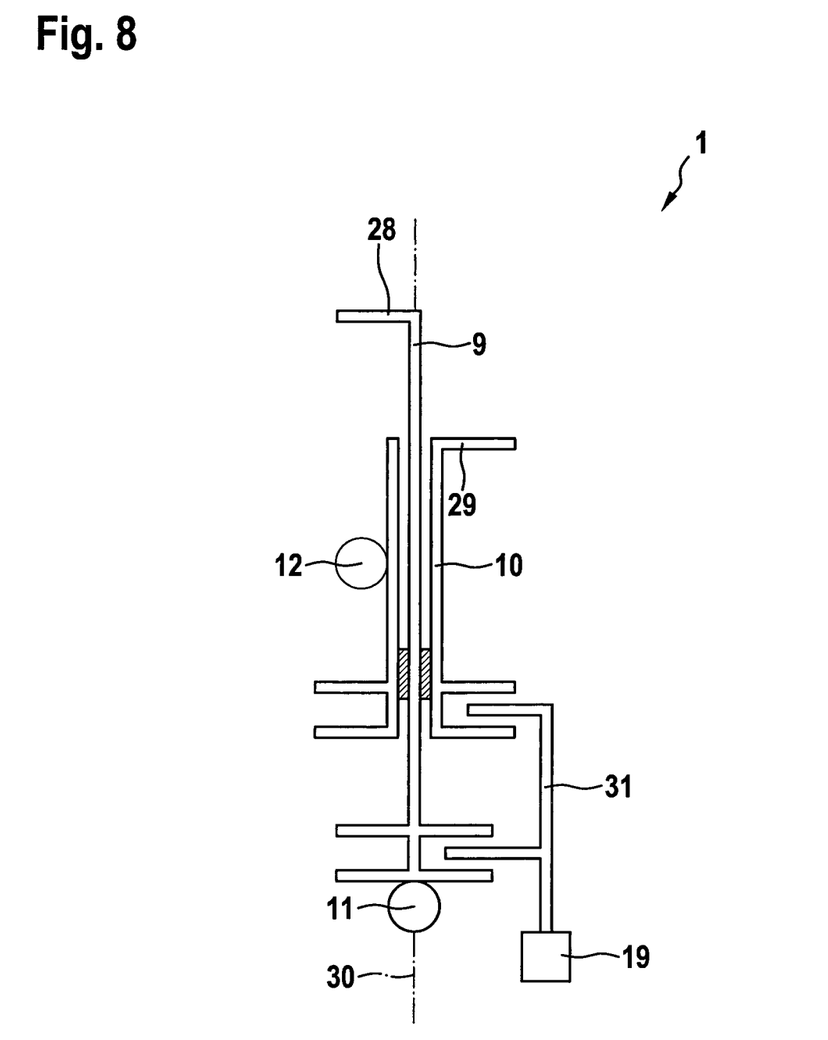

FIG. 8 shows a schematic representation of a third embodiment of the actuator device in a top view so that the rotation axis 30 is situated in the drawing plane. Generally reference is made to the description above. In this case the first direction is the circumferential direction relative to the rotation axis and the second direction is the axial direction relative to the rotation axis. Correspondingly rotation of the respective selector shaft 9 or 10 can be effected by means of the first setting devices 11 and 12. The second setting device 19 on the other hand serves for displacing the selector shafts 9 and 10 together in axial direction.

Figure 9:
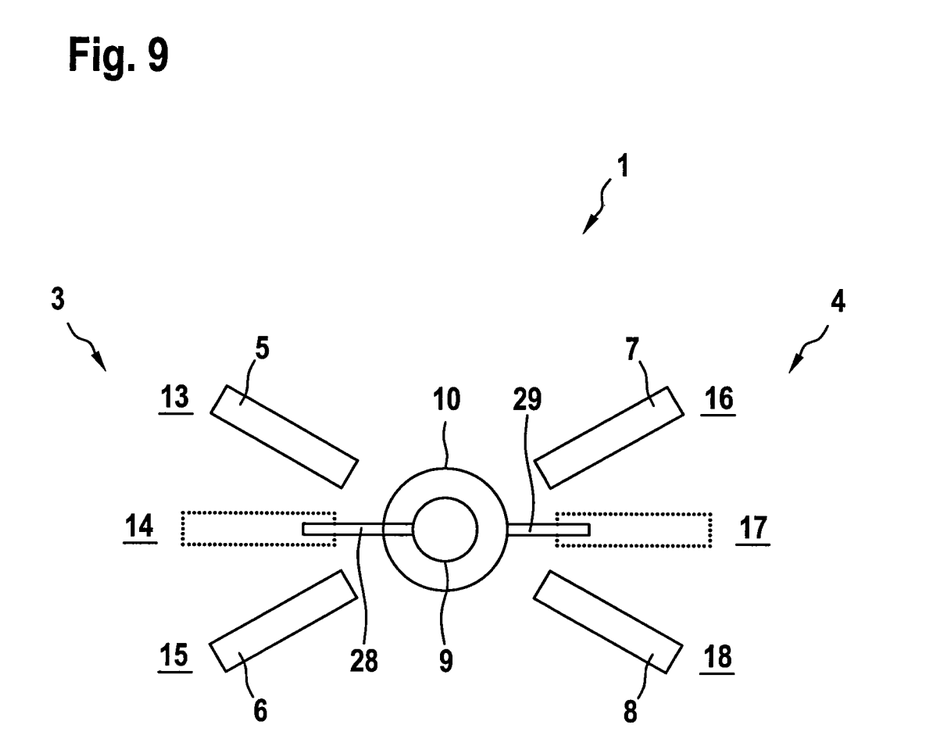

FIG. 9 shows a further view of the third embodiment, in a side view or sectional side view, in which the rotation axis 30 is perpendicular to the drawing plane.

The invention claimed is:

1. An actuator device for a transmission of a motor vehicle, comprising:
 a plurality of selector shafts displaceable into a first direction between multiple selection positions and in a second direction between multiple shifting positions, each said selector shafts having a connecting shaft, which in at least one of the selection positions is operatively connected with at least one selector rail of the transmission for transmitting a movement of the selector shaft in the second direction to the selector rail, wherein the selector shafts are mounted relative to each other so as to be movable relative to each other in the first direction and to be fixed relative to each other in the second direction;
 a plurality of first setting devices, wherein the selection positions of the selector shafts are settable independent of each other by the first setting devices; and
 a second setting device, wherein the selector shafts are displaceable together between the shifting positions by the second setting device, so that all selector shafts are always present in the same shifting position, and wherein the selector shafts are operatively connected with the second setting device via an intermediate shaft,
 wherein the intermediate shaft is rotatable about a rotation axis but fixed in an axial direction, wherein shaft-hub-connections are provided between the intermediate shaft and the selector shafts, so that the selector shafts are displaceable in the axial direction relative to the intermediate shaft.

2. The actuator device of claim 1, wherein each selector shaft is assigned one of the selector rails.

3. The actuator device of claim 1, wherein each selector shaft is assigned at least two of the selector rails.

4. The actuator device of claim 1, wherein the selector shafts are supported for rotation about a common rotation axis.

5. The actuator device of claim 1, wherein each selector shaft has a respective restoring device which respectively urges each selector shaft into a neutral one of the selection positions.

6. The actuator device of claim 1, wherein the first direction is the axial direction with regard to the rotation axis and/or the second direction is a circumferential direction with regard to the rotation axis, or wherein the first direction is the circumferential direction with regard to the rotation axis and/or the second direction is the axial direction with regard to the rotation axis.

7. The actuator device of claim 1, wherein the first setting devices are constructed as magnetic setting devices.

8. The actuator device of claim 1, wherein the second setting device is constructed as an electric motor, which is operatively connected to the selector shafts.

9. The actuator device of claim 1, wherein the selector shafts are supported on the intermediate shaft in rotative fixed relationship with the intermediate shaft.

10. A transmission of a motor vehicle, comprising an actuator device, said actuator device comprising
 a plurality of selector shafts displaceable into a first direction between multiple selection positions and in a second direction between multiple shifting positions, each said selector shafts having a connecting shaft, which in at least one of the selection positions is operatively connected with at least one selector rail of the transmission for transmitting a movement of the selector shaft in the second direction to the selector rail, wherein the selector shafts are mounted relative to each other so as to be movable relative to each other in the first direction and to be fixed relative to each other in the second direction;
 a plurality of first setting devices, wherein the selection positions of the selector shafts are settable independent of each other by the first setting devices; and
 a second setting device, wherein the selector shafts are displaceable together between the shifting positions by the second setting device, so that all selector shafts are always present in the same shifting position, and wherein the selector shafts are operatively connected with the second setting device via an intermediate shaft,
wherein the intermediate shaft is rotatable about a rotation axis but fixed in an axial direction, wherein shaft-hub-connections are provided between the intermediate shaft and the selector shafts, so that the selector shafts are displaceable in the axial direction relative to the intermediate shaft.

* * * * *